E. P. SHRADER.
PAWL AND RATCHET.
APPLICATION FILED MAY 5, 1910.
1,048,104.
Patented Dec. 24, 1912.
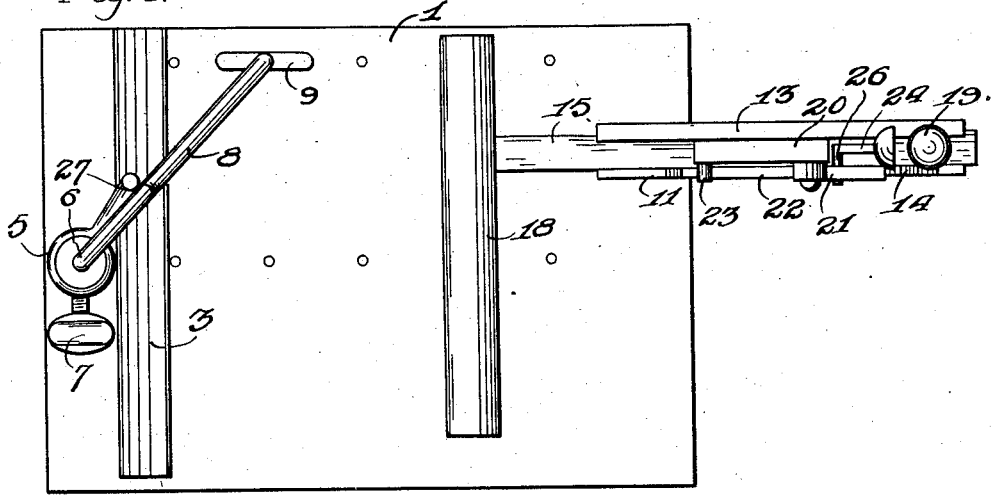
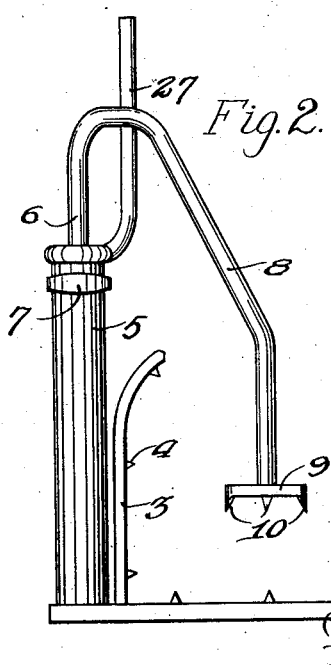
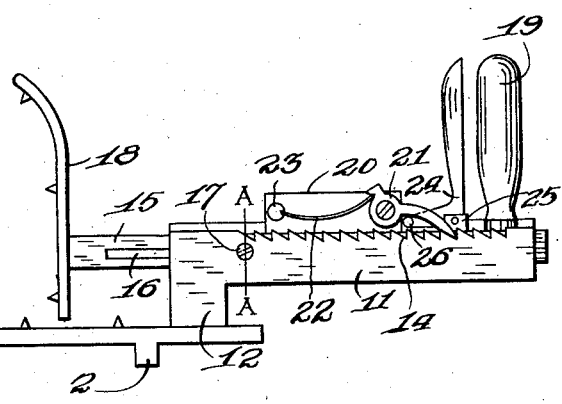
Inventor
Estes P. Shrader,
Witnesses
By E. E. Vrooman,
Attorney.
COLUMBIA PLANOGRAPH CO., WASHINGTON, D. C.

UNITED STATES PATENT OFFICE.

ESTES P. SHRADER, OF OAKLAND, CALIFORNIA.

PAWL AND RATCHET.

1,048,104.   Specification of Letters Patent.   Patented Dec. 24, 1912.

Application filed May 5, 1910. Serial No. 559,567.

*To all whom it may concern:*

Be it known that I, ESTES P. SHRADER, a citizen of the United States, residing at Oakland, in the county of Alameda and State of California, have invented certain new and useful Improvements in Pawls and Ratchets, of which the following is a specification.

This invention relates to devices for holding meat while being sliced, and the principal object of the same is to provide a novel type of sliding jaw having an improved type of pawl and ratchet arrangement for holding the sliding jaw in an adjusted position and for moving it from one position to another.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a top plan view of the improved meat holder. Fig. 2 is a view in side elevation thereof. Fig. 3 is a detail sectional view taken on the line A—A Fig. 2.

The improved meat holder may be used in stores or residences and comprises in its general organization a flat base designated by the numeral 1 which is provided with a pendent ledge 2 on its undersurface which may be engaged over an edge of a table, counter, or other support upon which the base is seated. On its upper surface the base 1 is provided with a vertical plate 3 which is elongated and extends substantially the entire width of base 1, the upper end thereof being inturned. The inner surface of said plate is provided with spurs 4. A vertically arranged post 5 is centrally located on base 1 behind plate 3, said post being preferably tubular and having a bar 6 pivotally and vertically movable therein. A set screw 7 extends into said post to lock said bar thereto. Said bar 6 projects well above the post 5 and terminates in a downturned arm 8 the free end of which carries a clamping plate 9 that is provided with spurs 10.

A guideway 11 has a pendent end portion 12 that is seated on the upper surface of base 1 opposite plate 3, said guideway projecting away from said base. One longitudinal side of said guideway is provided with an inwardly extending upper edge 13 that overhangs the guideway, and the upper edge of the opposite side of the guideway is provided with transverse ratchet teeth 14.

A shank 15 is slidably mounted in guideway 11, said shank having a longitudinal groove 16 formed in one side which is engaged by a pin 17 that projects through one side of the guideway to limit the sliding movement of said shank. Said shank projects beyond the guideway and overhangs the base 1 and is equipped with an end plate 18, complemental to and parallel with the stationary plate 3 of base 1. Adjacent the outer end, the shank 15 is provided with a handle 19, and at an intermediate point of the upper surface, said shank carries a block 20 upon which a pawl 21 is pivotally mounted that is normally held in position to engage the ratchet teeth 14 by means of a spring 22 carried by a lug 23 that projects laterally from one side of block 20. A bell crank lever 24 is pivotally connected to ears 25 carried by the shank 15 adjacent handle 19. The base member of said lever is provided with a laterally projecting lug 26 that extends beneath pawl 21 and is adapted to raise said pawl from engagement with teeth 14 when said lever is rocked in one direction. The upright member of said lever is adjacent to handle 19 so that it may be grasped to release the shank 15 from the guideway 11 at the same time the handle is grasped to adjust the shank in said guideway.

A stop 27, which is preferably a rod, projects from the upper portion of post 5 and is arranged to limit the pivotal movement of arm 8 in one direction.

It will be seen from the foregoing that this invention provides oppositely disposed elongated plates for firmly engaging opposite sides of a piece of meat resting on base 1, one of said plates being adjustable so that the pressure upon the meat may be regulated, and also a vertically and horizontally adjustable plate for engaging the upper portion of the meat. It will also be understood, that by means of the adjustability of the side and top plates, a piece of meat of any size can be rigidly clamped to the base.

It will be understood that the use of the top clamp especially adapts the invention for use in holding thin meat, such as bacon, so that it will be held firmly and consequently lie flat on base 1. Obviously this prevents the meat buckling while being sliced with the result that it is possible to cut thin and even slices.

What I claim as my invention is:—

A device of the character described comprising a guideway having its upper wall partially removed to form an overhanging retaining flange, one side wall being provided in its upper edge with a plurality of ratchet teeth, a bar passing through said guideway and provided with longitudinally extending grooves, a set screw passing through the side wall of said guideway and extending through said groove to limit the movement of said bar, a block carried by said bar, a pin carried by said block, a pawl pivotally connected with said block, a heel extending from said pawl, a spring carried by said pin and engaging said heel to normally hold said pawl in engagement with said ratchet teeth, and a lever carried by said pawl to engage the free end of said pawl and adapted to rock said pawl out of engagement with said ratchet teeth.

In testimony whereof I affix my signature in presence of two witnesses.

ESTES P. SHRADER.

Witnesses:
H. C. SCHROEDER,
E. G. GRAY.

---

Copies of this patent may be obtained for five cents each, by addressing the "Commissioner of Patents Washington, D. C."